United States Patent
Lv et al.

(10) Patent No.: US 11,740,129 B2
(45) Date of Patent: Aug. 29, 2023

(54) DIFFERENTIAL INTERFERENCE IMAGING SYSTEM CAPABLE OF RAPIDLY CHANGING SHEAR DIRECTION AND AMOUNT

(71) Applicant: SOUTH CHINA NORMAL UNIVERSITY, Guangdong (CN)

(72) Inventors: Xiaoxu Lv, Guangdong (CN); Chengxin Zhou, Guangdong (CN); Liyun Zhong, Guangdong (CN); Qinwen Ning, Guangdong (CN); Shengde Liu, Guangdong (CN)

(73) Assignee: SOUTH CHINA NORMAL UNIVERSITY, Guangzhou (CN)

( * ) Notice: Subject to any disclaimer, the term of this patent is extended or adjusted under 35 U.S.C. 154(b) by 52 days.

(21) Appl. No.: 17/298,615

(22) PCT Filed: Mar. 30, 2020

(86) PCT No.: PCT/CN2020/082094
§ 371 (c)(1),
(2) Date: May 31, 2021

(87) PCT Pub. No.: WO2021/068463
PCT Pub. Date: Apr. 15, 2021

(65) Prior Publication Data
US 2022/0003607 A1 Jan. 6, 2022

(30) Foreign Application Priority Data

Mar. 26, 2020 (CN) .......................... 202010222394.0

(51) Int. Cl.
*G01J 3/45* (2006.01)
*G02F 1/13363* (2006.01)
(Continued)

(52) U.S. Cl.
CPC ............... *G01J 3/45* (2013.01); *G01J 3/0224* (2013.01); *G01J 3/0229* (2013.01);
(Continued)

(58) Field of Classification Search
CPC .......... G01J 3/45; G01J 3/0224; G01J 3/0229; G01J 3/0237; G01J 3/12; G01J 2003/1291;
(Continued)

(56) References Cited

U.S. PATENT DOCUMENTS

| 6,404,544 | B1 * | 6/2002 | Kuhn | G02B 21/18 |
| | | | | 359/371 |
| 6,924,893 | B2 * | 8/2005 | Oldenbourg | G02B 21/0092 |
| | | | | 356/369 |
| 2009/0135422 | A1 * | 5/2009 | Miller | G01J 4/04 |
| | | | | 356/364 |

FOREIGN PATENT DOCUMENTS

| CN | 104655291 A | 5/2015 |
| CN | 108303020 A | 7/2018 |
| CN | 110806265 A | 2/2020 |

OTHER PUBLICATIONS

Oldenbourg, Rudolf, "Biomedical Optical Phase Microscopy and Nanoscopy", 2013, Elsevier Inc., pp. 311-338 (Year: 2013).*
(Continued)

*Primary Examiner* — Tarifur R Chowdhury
*Assistant Examiner* — Kemaya Nguyen

(57) ABSTRACT

A differential interference imaging system capable of rapidly changing shear direction and amount includes: a light source (101), a filter (102), a polarizer (103), a sample stage (104), an infinite imaging microobjective (105), a tube lens (106), a shear component, an analyzer (113), and an image sensor (114). After the light intensity and a polarization direction is adjusted, the linearly polarized light passes through a transparent sample, to be collected by the infinite imaging
(Continued)

microobjective (105) and to implement imaging through the tube lens (106). An imaging beam is divided into two linearly polarized light fields which are perpendicular to each other in the polarization directions and have tiny shear amount, then they are further combined into an interference light filed by the analyzer (103) to form a differential interference image in the image sensor (114). The system may be flexibly assembled, is simple in structure and easy to implement.

8 Claims, 5 Drawing Sheets

(51) Int. Cl.
 *G01J 3/02* (2006.01)
 *G01J 3/12* (2006.01)
(52) U.S. Cl.
 CPC ............... *G01J 3/0237* (2013.01); *G01J 3/12* (2013.01); *G02F 1/133638* (2021.01); *G01J 2003/1291* (2013.01)
(58) Field of Classification Search
 CPC ............. G01J 9/0215; G02F 1/133638; G01B 9/02098
 See application file for complete search history.

(56) References Cited

OTHER PUBLICATIONS

International Search Report of PCT Patent Application No. PCT/CN2020/082094 dated Dec. 28, 2020.

\* cited by examiner

DIFFERENTIAL INTERFERENCE IMAGING SYSTEM CAPABLE OF RAPIDLY CHANGING SHEAR DIRECTION AND AMOUNT

TECHNICAL FIELD

The disclosure relates to the field of optical technologies, in particular to a differential interference imaging system capable of rapidly changing shear direction and amount.

BACKGROUND

Differential interference imaging systems are widely used in detection and imaging of transparent samples. For example, a differential interference contrast microscope is mainly configured to transversely shear an interference imaging beam apart for a certain distance, and convert optical path differences, on different feature areas of samples, of two beams into intensity changes, so that a visual pseudo-3D (embossment) effect is produced, and detailed information of the transparent samples can be obviously observed. Compared with other types of microscopy techniques, the differential interference contrast microscope has the advantages of outstanding phase contrast, high spatial resolution, high optical sectioning capacity, no need of fluorescent labeling and staining, and the like, thereby achieving in-situ observation and measurement of the samples.

The conventional differential interference imaging system usually adopts a Nomarski prism to implement transverse shear of an objective beam, and has some obvious disadvantages: first, the special prism is required, which is much complicated in processing and adjusting; second, when the differential interference imaging system is used to observe the samples, due to different properties of the samples and changes of objective lenses having different magnifications, shear amount is required to be changed so as to achieve a better observation effect, and the conventional method is to replace different Nomarski prisms, which increases complexity of operations; third, the shear direction of the prisms for shearing is difficult to adjust, which brings a great limitation to use of the prisms; and fourth, quantitative measurement of the samples cannot be achieved, and it is difficult to meet requirements for data analysis.

SUMMARY

In view of this, to address the above-mentioned problems, it is necessary to provide a differential interference imaging technology based on the shear using liquid crystal variable retarders. According to this method, differential shear interference in a common path is implemented by using electro-optic birefringent effects of liquid crystals; through a combination of the liquid crystal variable retarders and plates, the shear direction and any shear amount can be rapidly accurately changed, so that tedious mechanical movements are avoided and ease of implementation is achieved.

A differential interference imaging system capable of rapidly changing shear direction and amount includes: a light source, a filter, a polarizer, a sample stage, an infinite imaging microobjective, a tube lens, a shear component, an analyzer, and an image sensor. After light intensity of linearly polarized light emitted from the light source is adjusted through the filter and a polarization direction of the linearly polarized light is adjusted through the polarizer, the linearly polarized light passes through a transparent sample on the sample stage, to be collected by the infinite imaging microobjective and to implement imaging through the tube lens; an imaging beam is divided, by the shear component, into two linearly polarized light fields which are perpendicular to each other in the polarization directions and have the tiny shear amount; the two linearly polarized light fields are further combined into an interference light filed by the analyzer, so that a differential interference image is formed in the image sensor.

Preferably, the shear component includes a first liquid crystal variable retarder, a first half-wave plate, a second liquid crystal variable retarder, a third liquid crystal variable retarder, a second half-wave plate, and a fourth liquid crystal variable retarder. By adjusting control voltages of the first liquid crystal variable retarder, the second liquid crystal variable retarder, the third liquid crystal variable retarder, and the fourth liquid crystal variable retarder, the shear direction can be rapidly accurately changed and any shear amount can be obtained.

Preferably, a space rectangular coordinate system is built, with a principal optical axis of a light path of the differential interference imaging system as a z-axis and the polarization direction of the linearly polarized light emitted from the light source as an x-axis; a slow axis direction of the polarizer is in an xy plane and forms an included angle of 45 degrees with the x-axis; a slow axis direction of the first liquid crystal variable retarder is the x-axis direction; a slow axis direction of the first half-wave plate is in the xy plane and forms an included angle of 45 degrees with the x-axis; a slow axis direction of the second liquid crystal variable retarder is the x-axis direction, and the second liquid crystal variable retarder and the first liquid crystal variable retarder are arranged in axial symmetry; a slow axis direction of the third liquid crystal variable retarder is the y-axis direction; a slow axis direction of the second half-wave plate is in the xy plane and forms an included angle of 45 degrees with the x-axis; a slow axis direction of the fourth liquid crystal variable retarder is the y-axis direction, and the fourth liquid crystal variable retarder and the third liquid crystal variable retarder are arranged in axial symmetry; a slow axis of the analyzer forms an included angle of 45 degrees with the x-axis; and the image sensor is arranged at an equivalent focal length in air, of the tube lens.

Preferably, the shear component includes a first convex lens, a first liquid crystal variable retarder, a second liquid crystal variable retarder, a half-wave plate, a third liquid crystal variable retarder, a fourth liquid crystal variable retarder, and a second convex lens. By adjusting control voltages of the first liquid crystal variable retarder, the second liquid crystal variable retarder, the third liquid crystal variable retarder, and the fourth liquid crystal variable retarder, the shear direction can be rapidly accurately changed and any shear amount can be obtained.

Preferably, a space rectangular coordinate system is built, with a principal optical axis of the differential interference imaging system as a z-axis and the polarization direction of the linearly polarized light emitted from the light source as an x-axis; a slow axis direction of the polarizer is in an xy plane and forms an included angle of 45 degrees with the x-axis; the first convex lens and the second convex lens together form a 4f system; a slow axis direction of the first liquid crystal variable retarder is the x-axis direction; a slow axis direction of the second liquid crystal variable retarder is the y-axis direction; a slow-axis direction of the half-wave plate is in the xy plane and forms an included angle of 45 degrees with the x-axis; a slow axis direction of the third liquid crystal variable retarder is the y-axis direction, and the third liquid crystal variable retarder and the second liquid crystal variable retarder are arranged in axial symmetry; a slow axis direction of the fourth crystal-liquid variable retarder is the x-axis direction, and the fourth crystal-liquid variable retarder and the first liquid crystal variable retarder are arranged in axial symmetry; a slow axis of the analyzer forms an included angle of 45 degrees with the x-axis; and the image sensor is arranged at an equivalent focal length in air, of the 4f system.

Preferably, the shear component includes a beam splitter, a first liquid crystal variable retarder, a second liquid crystal variable retarder, a quarter-wave plate, and a reflector. By adjusting control voltages of the first liquid crystal variable retarder and the second liquid crystal variable retarder, the shear direction can be rapidly accurately changed and any shear amount can be obtained.

Preferably, a space rectangular coordinate system is built, with a principal optical axis of the differential interference imaging system as a z-axis and the polarization direction of the linearly polarized light emitted from the light source as an x-axis; a slow axis direction of the polarizer is in an xy plane and forms an included angle of 45 degrees with the x-axis; a slow axis direction of the first liquid crystal variable retarder is the x-axis direction; a slow axis direction of the second liquid crystal variable retarder is the y-axis direction; a slow axis of the analyzer forms an included angle of 45 degrees with the x-axis; and the image sensor is arranged at an equivalent focal length in air, of the tube lens.

Preferably, the tiny shear amount ranges from 0 μm to 7.6 μm.

A differential interference imaging system capable of rapidly changing shear direction and amount includes a combination of liquid crystal variable retarders and plates, in a light path implementing interference imaging.

The disclosure further provides a differential interference imaging method. A combination of liquid crystal variable retarders and plates is used in a light path implementing interference imaging, control voltages of the liquid crystal variable retarders are adjusted to change orientation of liquid crystal molecules, so that the shear direction and the shear amount of a light beam to be subjected to interference imaging may be rapidly changed.

The differential interference imaging system provided by the disclosure may be flexibly assembled to a conventional optical microscope, is simple in structure and easy to implement, and can achieve research on morphologies and structures of samples by performing high-quality quantitative phase measurement on unstained samples. The shear component adopted in the disclosure is simple in structure, and is easy to adjust since there is no mechanical adjusting device. By adjusting drive voltages of nematic liquid crystal devices, the shear amount can be flexibly changed, and any shear direction can be obtained. Therefore, according to different properties of the samples, the optimal shear direction may be selected, to achieve the optimal phase contrast effect of the tested sample. In addition, the liquid crystal response time is only on the order of milliseconds, so that images in any shear direction can be rapidly obtained, and timeliness and convenience of measurement are enhanced.

DETAILED DESCRIPTION OF THE EMBODIMENTS

To further understand the disclosure, the disclosure is described below with reference to the drawings and specific embodiments in detail. It is to be noted that the embodiments described herein are only used to illustrate and explain the disclosure and not intended to limit the disclosure.

Embodiment 1

Figure 1:
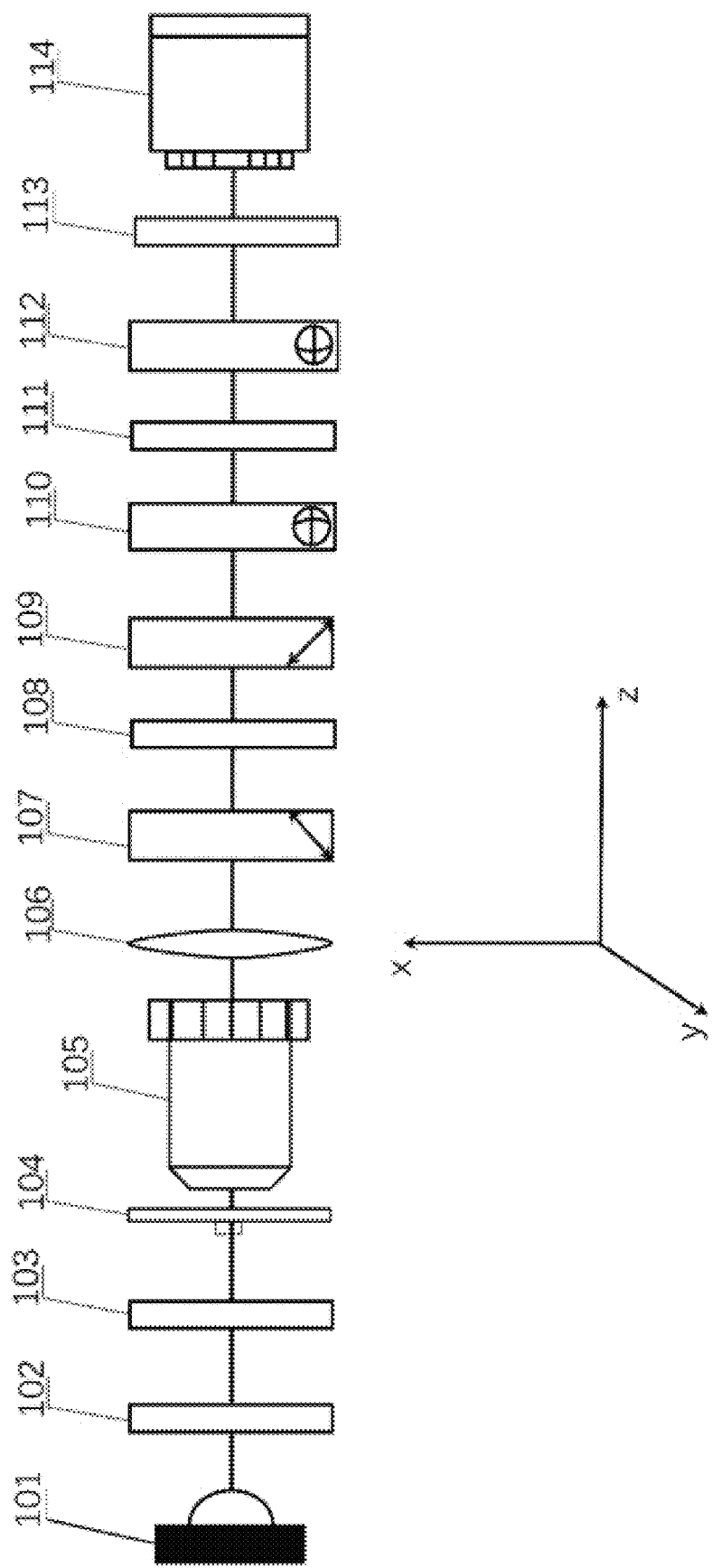
FIG. 1 is a schematic structural diagram of a transmission differential interference imaging system according to Embodiment 1 of the disclosure.

Referring to FIG. 1, a transmission differential interference imaging system according to Embodiment 1 of the disclosure includes: a light source 101, a filter 102, a polarizer 103, a sample stage 104, an infinite imaging microobjective 105, a tube lens 106, a first liquid crystal variable retarder 107, a first half-wave plate 108, a second liquid crystal variable retarder 109, a third liquid crystal variable retarder 110, a second half-wave plate 111, a fourth liquid crystal variable retarder 112, an analyzer 113, and an image sensor 114.

The first liquid crystal variable retarder 107, the first half-wave plate 108, the second liquid crystal variable retarder 109, the third liquid crystal variable retarder 110, the second half-wave plate 111, and the fourth liquid crystal variable retarder 112 together form a shear component.

The light source 110 emits linearly polarized light with a center wavelength of 650 nm and a bandwidth of 40 nm, and a polarization direction is along an x-axis of coordinate axes shown in the figure.

In the embodiment, the filter 102 is used to adjust light intensity generated by the light source 101 so that the light source 101 may achieve the appropriate intensity. The filter 102 is a neutral-density filter.

A slow axis direction of the polarizer 103 is in an xy plane of the coordinate axes shown in the figure, and forms an included angle of 45 degrees with the x-axis, so that a polarization direction of incident light may be adjusted.

The sample stage 104 is used to hold a transparent sample.

A slow axis direction of the first liquid crystal variable retarder 107 is the x-axis direction of the coordinate axes shown in the figure. Along with changes of a control voltage, an optical axis deflects in an xz plane.

A slow axis direction of the first half-wave plate 108 is in the xy plane of the coordinate axes shown in the figure, and forms an included angle of 45 degrees with the x-axis.

A slow axis direction of the second liquid crystal variable retarder 109 is the x-axis direction of the coordinate axes shown in the figure. Along with changes of the control voltage, the optical axis deflects in the xz plane. The second liquid crystal variable retarder 109 and the first liquid crystal variable retarder 107 are arranged in axial symmetry.

A slow axis direction of the third liquid crystal variable retarder 110 is the y-axis direction of the coordinate axes shown in the figure. Along with changes of the control voltage, the optical axis deflects in a yz plane.

A slow axis direction of the second half-wave plate 111 is in the xy plane of the coordinate axes shown in the figure, and forms an included angle of 45 degrees with the x-axis.

A slow axis direction of the fourth liquid crystal variable retarder 112 is the y-axis direction of the coordinate axes shown in the figure. Along with changes of the control voltage, the optical axis deflects in the yz plane. The fourth liquid crystal variable retarder 112 and the third liquid crystal variable retarder 110 are arranged in axial symmetry.

A slow axis of the analyzer 113 forms an included angle of 45 degrees with the x-axis of the coordinate axes shown in the figure.

The image sensor 114 is arranged at an equivalent focal length in air, of the tube lens 106.

When the transmission differential interference imaging system disclosed in the disclosure works, the linearly polarized light generated from the light source 101 is adjusted by rotating the filter 102, to achieve the appropriate light intensity. After a polarization state of the linearly polarized light is adjusted through the polarizer 103, the linearly polarized light is irradiated to the transparent sample, to be collected by the infinite imaging microobjective 105 and to implement imaging through the tube lens 106. A light beam passing through the tube lens 106 passes through the first liquid crystal variable retarder 107 in a form of convergent spherical wave. Due to electro-optic birefringent effects of liquid crystals, the light beam is differentially sheared into p-light and s-light of which vibration directions are perpendicular to each other, and the shear direction is along a positive direction of the x-axis. After the p-light and the s-light emitted from the first liquid crystal variable retarder 107 pass through the first half-wave plate 108, the polarization directions of the two linearly polarized light beams are rotated 90 degrees. The incident p-light is converted into s-light, while the incident s-light is converted into p-light. The p-light obtained after the conversion through the first half-wave plate 108 passes through the second liquid crystal variable retarder 109, and is sheared apart a certain distance through differential shearing, along a negative direction of the x-axis. In such case, the shear amount along the x-axis direction is the total of the shears through the first liquid crystal variable retarder 107 and the second liquid crystal variable retarder 109. The principle in the process that the s-light and the p-light sheared apart pass through the third liquid crystal variable retarder 110, the second half-wave plate 111 and the fourth liquid crystal variable retarder 112 is the same as the above shear principle. Since the slow axis directions of the first liquid crystal variable retarder 107 and the second liquid crystal variable retarder 109 are along the x-axis, the differential shearing along the x-axis direction is achieved. Since the slow axis directions of the third liquid crystal variable retarder 110 and the fourth liquid crystal variable retarder 112 are along the y-axis direction, the differential shearing along the y-axis direction is achieved, and the shear amount along the x-axis and the y-axis each may be controlled through a liquid crystal drive power, the polarization directions of the sheared light beams are adjusted through the analyzer 113, and then the light beams are collected by the image sensor 114. The image sensor 114 is located at an equivalent air back focal plane of the tube lens 106. In such case, the shear amount and the shear direction are respectively the resultant amount and the resultant direction of the shears along the x-axis direction and the y-axis direction mentioned above. By adjusting the control voltages of the first liquid crystal variable retarder 107, the second liquid crystal variable retarder 109, the third liquid crystal variable retarder 110, and the fourth liquid crystal variable retarder 112, the shear direction can be rapidly accurately changed and any shear amount can be obtained.

Embodiment 2

Figure 2:
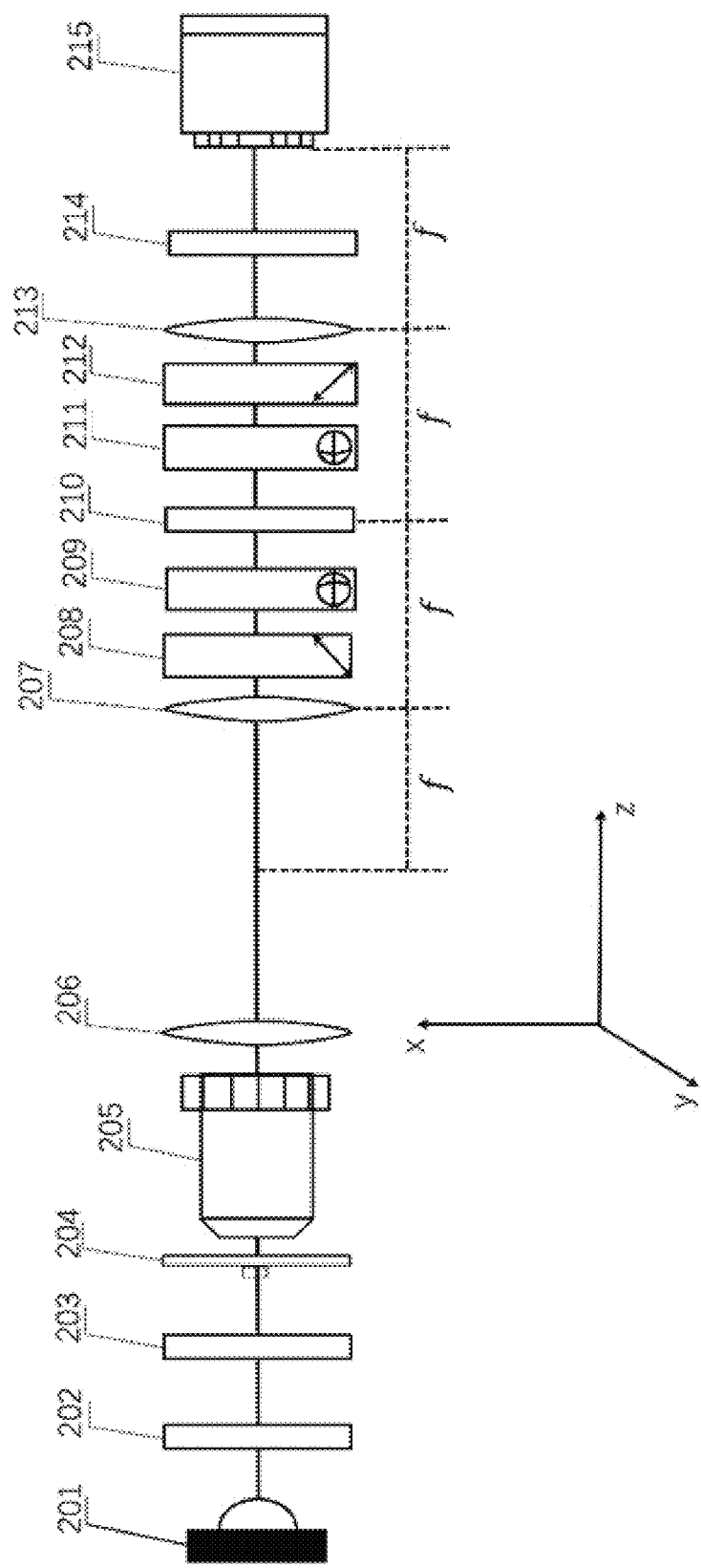
FIG. 2 is a schematic structural diagram of a symmetrical-transmission differential interference imaging system according to Embodiment 2 of the disclosure.

Referring to FIG. 2, a symmetrical-transmission differential interference imaging system according to Embodiment 2 of the disclosure includes: a light source 201, a filter 202, a polarizer 203, a sample stage 204, an infinite imaging microobjective 205, a tube lens 206, a first convex lens 207, a first liquid crystal variable retarder 208, a second liquid crystal variable retarder 209, a half-wave plate 210, a third liquid crystal variable retarder 211, a fourth liquid crystal variable retarder 212, a second convex lens 213, an analyzer 214, and an image sensor 215.

The first convex lens 207, the first liquid crystal variable retarder 208, the second liquid crystal variable retarder 209, the half-wave plate 210, the third liquid crystal variable retarder 211, the fourth liquid crystal variable retarder 212, and the second convex lens 213 together form a shear component.

The light source 201 emits linearly polarized light with a center wavelength of 650 nm and a bandwidth of 40 nm, and a polarization direction is along an x-axis of coordinate axes shown in the figure.

In the embodiment, the filter 202 is used to adjust light intensity generated by the light source 201 so that the light source 201 may achieve the appropriate intensity. The filter 202 is a neutral-density filter.

A slow axis direction of the polarizer 203 is in an xy plane of the coordinate axes shown in the figure, and forms an included angle of 45 degrees with the x-axis, so that a polarization direction of incident light may be adjusted.

The sample stage 204 is used to hold a transparent sample.

A focal length between the first convex lens 207 and the second convex lens 213 is 45 mm, and the two convex lenses together form a 4f system.

A slow axis direction of the first liquid crystal variable retarder 208 is the x-axis direction of the coordinate axes shown in the figure. Along with changes of a control voltage, an optical axis deflects in an xz plane.

A slow axis direction of the second liquid crystal variable retarder 209 is the y-axis direction of the coordinate axes shown in the figure. Along with changes of the control voltage, the optical axis deflects in a yz plane.

A slow axis direction of the half-wave plate 210 is in the xy plane of the coordinate axes shown in the figure, and forms an included angle of 45 degrees with the x-axis.

A slow axis direction of the third liquid crystal variable retarder 211 is the y-axis direction of the coordinate axes shown in the figure. Along with changes of the control voltage, the optical axis deflects in the yz plane. The third liquid crystal variable retarder 211 and the second liquid crystal variable retarder 209 are arranged in axial symmetry.

A slow axis direction of the fourth liquid crystal variable retarder 212 is the x-axis direction of the coordinate axes shown in the figure. Along with changes of the control voltage, the optical axis deflects in the xz plane. The fourth liquid crystal variable retarder 212 and the first liquid crystal variable retarder 208 are arranged in axial symmetry.

A slow axis of the analyzer 214 forms an included angle of 45 degrees with the x-axis of the coordinate axes shown in the figure.

The image sensor 215 is arranged at an equivalent focal length in air, of the 4f system. When the symmetrical-transmission differential interference imaging system provided by the disclosure works, linearly polarized light generated from the light source 201 is adjusted by rotating the filter 202, to achieve the appropriate light intensity. After a polarization state of the linearly polarized light is adjusted through the polarizer 203, the linearly polarized light is irradiated to the transparent sample 204, to be collected by the infinite imaging microobjective 105 and to implement imaging through the tube lens 206. An image formed through the tube lens 206 is transferred to a target plane of the image sensor 215 through the 4f system. The following is the specific shear process.

An imaging beam passing through the tube lens 206 is collected by the first convex lens 207, and forms a convergent spherical wave to pass through the first liquid crystal variable retarder 208. Due to electro-optic birefringent effects of liquid crystals, the light beam is divided into p-light and s-light of which vibration directions are perpendicular to each other, and the p-light is sheared apart a tiny distance along a positive direction of the x-axis. After the p-light and the s-light emitted from the first liquid crystal variable retarder 208 pass through the second liquid crystal variable retarder 209, the s-light is sheared apart a tiny distance along a negative direction of the x-axis, while the p-light is not affected. The half-wave plate 210 is placed at a spectrum surface of the 4f system. After the p-light and the s-light, which are respectively sheared along the x-axis direction and the y-axis direction, pass through the half-wave plate 210, polarization directions of the two linearly polarized light beams are rotated 90 degrees, the incident p-light is converted into s-light while the incident s-light is converted into p-light. The s-light acquired after conversion of polarization state passes through the third liquid crystal variable retarder 211, following by being sheared apart a tiny distance along the positive direction of the y-axis, and the p-light after conversion of polarization states is not affected. After the p-light and the s-light emitted from the third liquid crystal variable retarder 211 pass through the fourth liquid crystal variable retarder 212, the p-light after conversion of polarization states is sheared apart a tiny distance along a negative direction of the x-axis. The p-light and the s-light that are respectively sheared twice are converged by the second convex lens 213, and polarization directions of the p-light and the s-light are adjusted by the analyzer 214, so that a differential image formed finally is collected by the image sensor 215. The image sensor 215 is located at an equivalent air back focal plane of the 4f system. In such case, the shear amount and the shear direction are the resultant amount and the resultant direction of the shears along the x-axis direction and the y-axis direction mentioned above. By adjusting the control voltages of the first liquid crystal variable retarder 208, the second liquid crystal variable retarder 209, the third liquid crystal variable retarder 211, and the fourth liquid crystal variable retarder 212, the shear direction can be rapidly accurately changed and any shear amount can be obtained.

Embodiment 3

Figure 3:
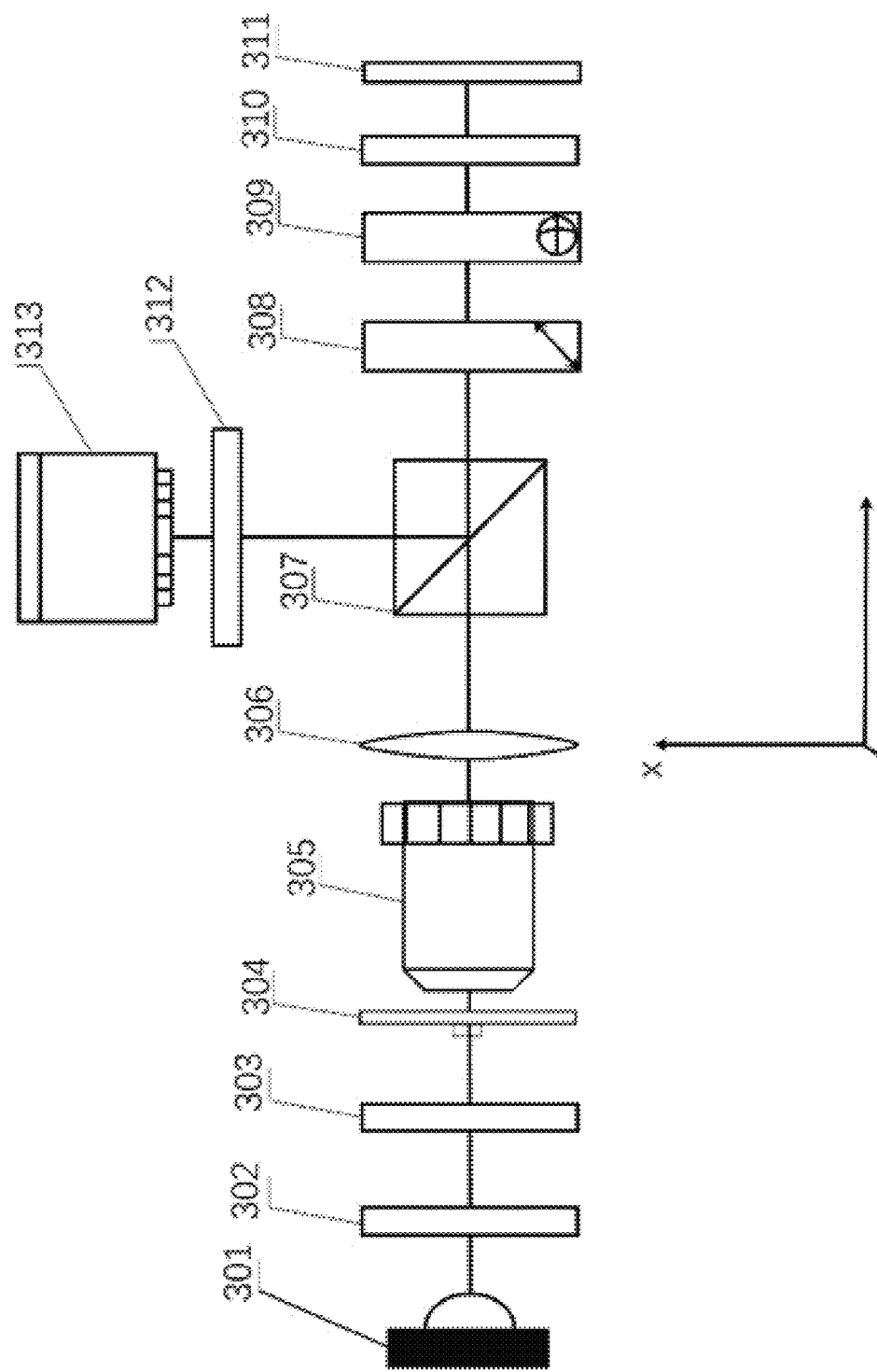
FIG. 3 is a schematic structural diagram of a reflection differential interference imaging system according to Embodiment 3 of the disclosure.

Referring to FIG. 3, a reflection differential interference imaging system according to Embodiment 3 of the disclosure includes:

a light source 301, a filter 302, a polarizer 303, a sample stage 304, an infinite imaging microobjective 305, a tube lens 306, a beam splitter 307, a first liquid crystal variable retarder 308, a second liquid crystal variable retarder 309, a quarter-wave plate 310, a reflector 311, an analyzer 312, and an image sensor 313.

The beam splitter 307, the first liquid crystal variable retarder 308, the second liquid crystal variable retarder 309, the quarter-wave plate 310, and the reflector 311 together form a shear component.

The light source 301 emits linearly polarized light with a center wavelength of 650 nm and a bandwidth of 40 nm, and a polarization direction is along an x-axis of coordinate axes shown in the figure.

In the embodiment, the filter 302 is used to adjust light intensity generated by the light source 301 so that the light source 301 may achieve the appropriate intensity. The filter 302 is a neutral-density filter.

A slow axis direction of the polarizer 303 is in an xy plane of the coordinate axes shown in the figure, and forms an included angle of 45 degrees with the x-axis, so that a polarization direction of incident light may be adjusted.

The sample stage 304 is used to hold a transparent sample.

A slow axis direction of the first liquid crystal variable retarder 308 is the x-axis direction of the coordinate axes shown in the figure. Along with changes of a control voltage, an optical axis deflects in an xz plane.

A slow axis direction of the second liquid crystal variable retarder 309 is the y-axis direction of the coordinate axes shown in the figure. Along with changes of the control voltage, the optical axis deflects in a yz plane.

A slow axis of the analyzer 312 forms an included angle of 45 degrees with the x-axis of the coordinate axes shown in the figure.

The image sensor 313 is arranged at an equivalent focal length in air, of the tube lens 306.

When the reflection differential interference imaging system disclosed in the disclosure works, the linearly polarized light generated from the light source 301 is adjusted by rotating the filter 302, to achieve the appropriate light intensity. After a polarization state of the linearly polarized light is adjusted through the polarizer 303, the linearly polarized light is irradiated to the transparent sample, to be collected by the infinite imaging microobjective 305 and to implement imaging through the tube lens 306. A light beam passing through the tube lens 306 transmits from the beam splitter 307 in a form of convergent spherical wave, and enters the first liquid crystal variable retarder 308. Due to electro-optic birefringent effects of liquid crystals, the light beam is divided into p-light and s-light of which vibration directions are perpendicular to each other, and the p-light is sheared apart a tiny distance along a positive direction of the x-axis. After the p-light and the s-light emitted from the first liquid crystal variable retarder 308 pass through the second liquid crystal variable retarder 309, the s-light is sheared apart a tiny distance along a negative direction of the x-axis, while the p-light is not affected. After the two light beams obtained by shearing pass through the quarter-wave plate 310, the p-light is converted into right-hand circularly polarized light, and the s-light is converted into left-hand circularly polarized light. After being reflected by the reflector 311 and passing through the quarter-wave plate 310 again, the two circularly polarized light beams are respectively converted into linearly polarized light beams of which the polarization directions are perpendicular to each other. The polarization directions of the two linearly polarized light beams that are reflected are rotated 90 degrees as compared with the polarization direction of the incident light. The s-light acquired after reflection passes through the second liquid crystal variable retarder 309, and is sheared apart a tiny distance along a positive direction of the y-axis. The p-light acquired after reflection passes through the first liquid crystal variable retarder 308, and is sheared apart a tiny distance along a negative direction of the x-axis. After the two light beams that are sheared are reflected by the beam splitter 307, the polarization directions of the light beams are adjusted through the analyzer 312, and the light beams are subjected to interference imaging at a target plane of the image sensor 313. In such case, the shear amount and the shear direction are the resultant amount and the resultant direction of the shears along the x-axis direction and the y-axis direction as mentioned above. By adjusting the control voltages of the first liquid crystal variable retarder 308 and the second liquid crystal variable retarder 309, the shear direction can be rapidly accurately changed and any shear amount can be obtained.

When the shear component does not start a shear mode, complex amplitudes of two orthogonally polarized light beams on the target plane of the image sensor 313 are:

$$E_p(x,y)=a_p(x,y)\exp\{j[\varphi(x,y)+\delta]\}$$

$$E_s(x,y)=a_s(x,y)\exp\{j\varphi(x,y)\} \text{ respectively,}$$

where $E_p(x, y)$ and $E_s(x, y)$ are respectively the complex amplitudes of the p-light and the s-light of the incident light, $a_p(x, y)$ and $a_s(x, y)$ are respectively amplitudes of vibration corresponding thereto, $\varphi(x, y)$ is a phase to be measured, and $\delta$ is a phase shift introduced to the p-light by a phase shifter during measurement.

When the shear component starts a shear mode, complex amplitudes of the two orthogonally polarized light beams on the target plane of the image sensor 313 are:

$$E_p(x,y)=a_p(x,y)\exp\{j[\varphi(x+\Delta_x/2,y+\Delta_y/2)+\delta]\}$$

$$E_s(x,y)=a_s(x,y)\exp\{j\varphi(x-\Delta_x/2,y-\Delta_y/2)\} \text{ respectively.}$$

After the light beams pass through the analyzer 312, an image formed on the target plane of the image sensor 313 is:

$$I(x,y)=(|a_p|^2+|a_s|^2+a_p a_s \exp\{j[\Delta\varphi(x,y)+\delta]\})/2$$

$$\Delta\varphi(x,y)=\varphi(x+\Delta_x/2,y+\Delta_y/2)-\varphi(x-\Delta_x/2,y-\Delta_y/2)$$

where $\Delta\varphi(x, y)$ is a differential phase. Four images, formed when the phase shift $\delta$ is 0, $\pi/2$, $\pi$, and $3\pi/2$, respectively, are acquired; and by a four-step phase shift algorithm, distribution of the differential phase of the tested sample may be calculated.

In Embodiment 3, both the first liquid crystal variable retarder 308 and the second liquid crystal variable retarder 309 are liquid crystal devices, with thickness of liquid crystal layers being 30 μm and clear aperture being 20 mm, and the drive voltage ranges from 0 V to 1.1 V, so that the shear direction and the shear mount may be adjusted conveniently, rapidly and optionally, without using mechanical adjusting devices. An adjustment range of the shear amount is 0-7.6μ, and an adjustment range of the azimuth is 0-90 degrees.

Figure 4:
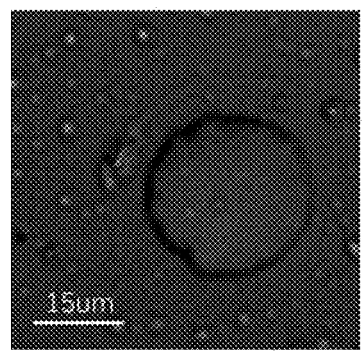
FIG. 4 shows a light field image of a polystyrene sphere acquired by the differential interference imaging system according to Embodiment 1 of the disclosure.
Figure 5:
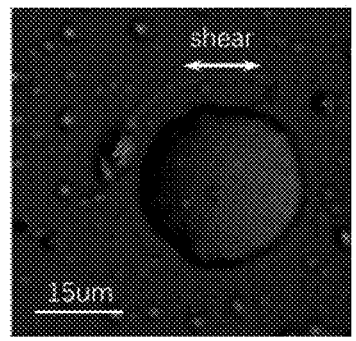
FIG. 5 shows a differential image of a polystyrene sphere acquired through transverse shear of the differential interference imaging system according to Embodiment 1 of the disclosure.
Figure 6:
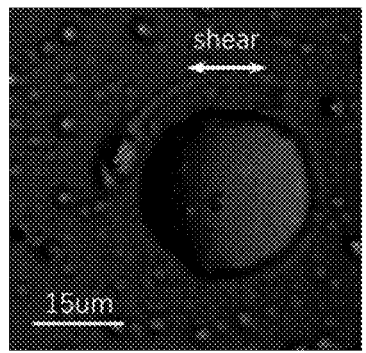
FIG. 6 shows a differential image of a polystyrene sphere acquired, by the differential interference imaging system according to Embodiment 1 of the disclosure, after the transverse shear amount is increased.
Figure 7:
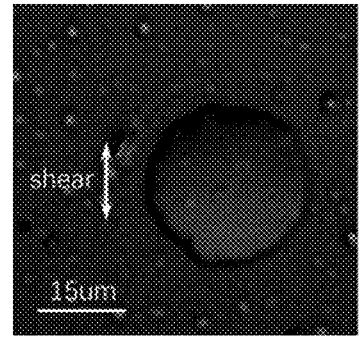
FIG. 7 shows a differential image of a polystyrene sphere acquired through longitudinal shear of the differential interference imaging system according to Embodiment 1 of the disclosure.
Figure 8:
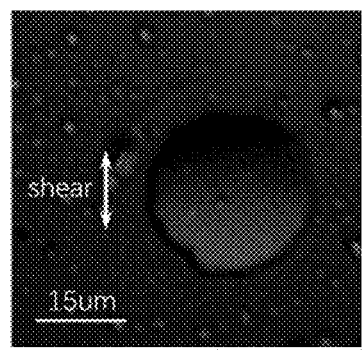
FIG. 8 shows a differential image of a polystyrene sphere acquired, by the differential interference imaging system according to Embodiment 1 of the disclosure, after the longitudinal shear amount is increased.
Figure 9:
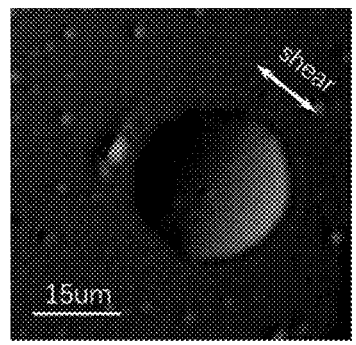
FIG. 9 shows a differential image of a polystyrene sphere acquired through diagonal shear of the differential interference imaging system according to Embodiment 1 of the disclosure.

To test the differential interference imaging system based on the liquid crystal variable retarders according to the disclosure, imaging experiments are respectively performed for Embodiment 1, Embodiment 2, and Embodiment 3. FIG. 4 shows a light field image having the same effect with the conventional optical microscope and acquired when the drive voltages of the liquid crystal variable retarders are 0 V. When the drive voltages of the third liquid crystal variable retarder 110 and the fourth liquid crystal variable retarder 112 are increased, the imaging beam is sheared along a horizontal direction, the sample has a certain gray gradient along the shear direction, so that the sample looks more stereoscopic, and the differential image with a certain contrast, as shown in FIG. 5, may be observed. When the drive voltages of the third liquid crystal variable retarder 110 and the fourth liquid crystal variable retarder 112 are continuously increased, the shear amount is increased, the regional contrast of the sample is increased further, so that the differential image as shown in FIG. 6 is obtained. When the drive voltages of the third liquid crystal variable retarder 110 and the fourth liquid crystal variable retarder 112 are adjusted to be zero while the drive voltages of the first liquid crystal variable retarder 107 and the second liquid crystal variable retarder 109 are continuously increased, the shear direction is a vertical direction, so that the differential image of the sample longitudinally sheared, as shown in FIG. 7, may be obtained. When the drive voltages of the first liquid crystal variable retarder 107 and the second liquid crystal variable retarder 109 are further increased, the shear amount along the vertical direction is increased, so that the differential image of the sample with an increased contrast, as shown in FIG. 8, may be obtained. When the drive voltages of the first liquid crystal variable retarder 107, the second liquid crystal variable retarder 109, the third liquid crystal variable retarder 110 and the fourth liquid crystal variable retarder 112 are simultaneously increased, the differential image of the sample obliquely sheared, as shown in FIG. 9, may be obtained. By adjusting the control voltages of the liquid crystal variable retarders, the shear amount along the x-axis direction and the y-axis direction of the coordinate axes shown in the figure may be changed, and thus any shear direction and shear amount may be obtained.

In Embodiment 2 and Embodiment 3, structure and configuration of the shear light path are changed, so that the differential images of the sample, as shown in FIG. 4 to FIG. 9 are obtained.

The differential interference imaging system according to the disclosure may be flexibly assembled to a conventional optical microscope, is simple in structure and easy to implement, and can achieve research on morphologies and structures of samples by performing high-quality quantitative phase measurement on unstained samples. The shear component adopted by the disclosure is simple in structure, and is easy to adjust since there is no mechanical adjuster. By adjusting the drive voltages of nematic liquid crystal devices, the shear amount can be flexibly changed, and any shear direction can be obtained. Therefore, according to different properties of samples, the optimal shear direction may be selected to achieve the optimal phase contrast effect of the tested sample. In addition, the liquid crystal response time is only on the order of milliseconds, so that images in any shear direction can be quickly obtained, and timeliness and convenience of measurement are enhanced.

The embodiments described above only express several implementation modes of the disclosure, the description of which is more specific and detailed, but should not be interpreted as a limitation to the patent scope of the disclosure. It is to be noted that those skilled in the art can make various transformations and modifications without departing from the concept of the disclosure, and these transformations and modifications shall fall within the scope of protection of the disclosure. Therefore, the scope of protection of the disclosure shall be subject to the appended claims.

What is claimed is:

1. A differential interference imaging system capable of rapidly changing shear direction and amount, comprising:
   a light source,
   a filter,
   a polarizer,
   a sample stage,
   an infinite imaging microobjective,
   a tube lens,
   a shear component,
   an analyzer, and
   an image sensor,
   wherein after light intensity of linearly polarized light emitted from the light source is adjusted through the filter and a polarization direction of the linearly polarized light is adjusted through the polarizer, the linearly polarized light passes through a transparent sample on the sample stage, to be collected by the infinite imaging microobjective and to implement imaging through the tube lens;
   an imaging beam is divided, by the shear component, into two linearly polarized light fields which are perpendicular to each other in the polarization directions and have a shear amount;
   the two linearly polarized light fields are further combined into an interference light filed by the analyzer, so that a differential interference image is formed in the image sensor.

2. The differential interference imaging system capable of rapidly changing the shear direction and amount according to claim 1, wherein the shear component comprises
   a first liquid crystal variable retarder,
   a first half-wave plate,
   a second liquid crystal variable retarder,
   a third liquid crystal variable retarder,
   a second half-wave plate, and
   a fourth liquid crystal variable retarder;
   by adjusting control voltages of the first liquid crystal variable retarder, the second liquid crystal variable retarder, the third liquid crystal variable retarder, and the fourth liquid crystal variable retarder, the shear direction can be rapidly accurately changed and any shear amount can be obtained.

3. The differential interference imaging system capable of rapidly changing the shear direction and amount according to claim 2, wherein a space rectangular coordinate system is built, with
   a principal optical axis of a light path of the differential interference imaging system as a z-axis and a polarization direction of linearly polarized light emitted from the light source as an x-axis;
   a slow axis direction of the polarizer is in an xy plane and forms an included angle of 45 degrees with the x-axis;
   a slow axis direction of the first liquid crystal variable retarder is the x-axis direction, and a slow axis direction of the first half-wave plate is in the xy plane and forms an included angle of 45 degrees with the x-axis;
   a slow axis direction of the second liquid crystal variable retarder is the x-axis direction, and the second liquid crystal variable retarder and the first liquid crystal variable retarder are arranged in axial symmetry;
   a slow axis direction of the third liquid crystal variable retarder is the y-axis direction, and a slow axis direction of the second half-wave plate is in the xy plane and forms an included angle of 45 degrees with the x-axis;
   a slow axis direction of the fourth liquid crystal variable retarder is the y-axis direction, and the fourth liquid crystal variable retarder and the third liquid crystal variable retarder are arranged in axial symmetry;
   a slow axis of the analyzer forms an included angle of 45 degrees with the x-axis;
   and the image sensor is arranged at an equivalent focal length in air, of the tube lens.

4. The differential interference imaging system capable of rapidly changing the shear direction and amount according to claim 1, wherein the shear component comprises
   a first convex lens,
   a first liquid crystal variable retarder,
   a second liquid crystal variable retarder,
   a half-wave plate,
   a third liquid crystal variable retarder,
   a fourth liquid crystal variable retarder, and
   a second convex lens;
   by adjusting control voltages of the first liquid crystal variable retarder, the second liquid crystal variable retarder, the third liquid crystal variable retarder, and the fourth liquid crystal variable retarder, the shear direction can be rapidly accurately changed and any shear amount can be obtained.

5. The differential interference imaging system capable of rapidly changing the shear direction and amount according to claim 4, wherein a space rectangular coordinate system is built, with
   a principal optical axis of the differential interference imaging system as a z-axis and a polarization direction of linearly polarized light emitted from the light source as an x-axis;
   a slow axis direction of the polarizer is in an xy plane and forms an included angle of 45 degrees with the x-axis;
   the first convex lens and the second convex lens together form a 4f system; a slow axis direction of the first liquid crystal variable retarder is the x-axis direction;
   a slow axis direction of the second liquid crystal variable retarder is the y-axis direction;
   a slow-axis direction of the half-wave plate is in the xy plane and forms an included angle of 45 degrees with the x-axis;
   a slow axis direction of the third liquid crystal variable retarder is the y-axis direction, and the third liquid crystal variable retarder and the second liquid crystal variable retarder are arranged in axial symmetry;
   a slow axis direction of the fourth crystal-liquid variable retarder is the x-axis direction, and the fourth crystal-liquid variable retarder and the first liquid crystal variable retarder are arranged in axial symmetry;
   a slow axis of the analyzer forms an included angle of 45 degrees with the x-axis;
   and the image sensor is arranged at an equivalent focal length in air, of the 4f system.

6. The differential interference imaging system capable of rapidly changing the shear direction and amount according to claim 1, wherein the shear component comprises a beam splitter, a first liquid crystal variable retarder, a second liquid crystal variable retarder, a quarter-wave plate, and a reflector;

by adjusting control voltages of the first liquid crystal variable retarder and the second liquid crystal variable retarder, the shear direction can be rapidly accurately changed and any shear amount can be obtained.

7. The differential interference imaging system capable of rapidly changing the shear direction and amount according to claim 6, wherein a space rectangular coordinate system is built, with a principal optical axis of the differential interference imaging system as a z-axis and a polarization direction of linearly polarized light emitted from the light source as an x-axis;

a slow axis direction of the polarizer is in an xy plane and forms an included angle of 45 degrees with the x-axis;

a slow axis direction of the first liquid crystal variable retarder is the x-axis direction;

a slow axis direction of the second liquid crystal variable retarder is the y-axis direction;

a slow axis of the analyzer forms an included angle of 45 degrees with the x-axis; and the image sensor is arranged at an equivalent focal length in air, of the tube lens.

8. The differential interference imaging system capable of rapidly changing the shear direction and amount according to claim 1, wherein the shear amount is greater than 0 pm and has a maximum up to 7.6 pm.

\* \* \* \* \*